(12) United States Patent
McBryan et al.

(10) Patent No.: US 10,834,241 B1
(45) Date of Patent: Nov. 10, 2020

(54) STREAMING EDITOR CIRCUIT FOR IMPLEMENTING A PACKET DEPARSING PROCESS

(71) Applicant: Xilinx, Inc., San Jose, CA (US)

(72) Inventors: Ian McBryan, Dublin (IE); Gordon J. Brebner, Monte Sereno, CA (US); Jaime Herrera, Dublin (IE); Rowan Lyons, Dublin (IE)

(73) Assignee: XILINX, INC., San Jose, CA (US)

( * ) Notice: Subject to any disclaimer, the term of this patent is extended or adjusted under 35 U.S.C. 154(b) by 37 days.

(21) Appl. No.: 16/242,876

(22) Filed: Jan. 8, 2019

(51) Int. Cl.
  *H04J 3/24* (2006.01)
  *H04L 29/06* (2006.01)
  *H04L 12/723* (2013.01)

(52) U.S. Cl.
  CPC .............. *H04L 69/22* (2013.01); *H04L 45/50* (2013.01); *H04L 69/166* (2013.01)

(58) Field of Classification Search
  CPC ................... H04L 29/0653; H04L 2012/5652
  See application file for complete search history.

(56) References Cited

U.S. PATENT DOCUMENTS

| | | | | |
|---|---|---|---|---|
| 6,976,149 | B1* | 12/2005 | Brandt | H04L 45/60 711/209 |
| 8,625,438 | B1 | 1/2014 | Attig | |
| 8,743,882 | B1* | 6/2014 | Kopelman | H04L 12/462 370/392 |
| 9,270,517 | B1 | 2/2016 | Attig et al. | |
| 9,674,081 | B1 | 6/2017 | Jiang et al. | |
| 9,899,088 | B1 | 2/2018 | Jiang | |
| 9,906,443 | B1* | 2/2018 | Singh | H04L 45/54 |
| 10,412,018 | B1* | 9/2019 | Feng | H04L 49/3027 |
| 10,505,861 | B1* | 12/2019 | Li | H04L 45/7453 |
| 2003/0041229 | A1* | 2/2003 | Sandbote | G06F 9/30101 712/223 |
| 2011/0085464 | A1* | 4/2011 | Nordmark | H04L 47/625 370/252 |

(Continued)

OTHER PUBLICATIONS

Attig, Michael et al., "400 Gb/s Programmable Packet Parsing on a Single FPGA," In Proc. ANCS, 2011, pp. 12-23.

(Continued)

*Primary Examiner* — Siren Wei
(74) *Attorney, Agent, or Firm* — Craige Thompson; Thompson Patent Law

(57) ABSTRACT

Apparatus and associated methods relating to data packet deparsing include an editing circuit configured to perform one or more predetermined editing operations on headers of an incoming data packet step by step without extracting all headers from the incoming data packet. In an illustrative example, an editor circuit may include an updating circuit configured to receive the data packet and update a header in the data packet. The editor circuit may also include a removal circuit configured to remove a header from the data packet. The editor circuit may also include an insertion circuit configured to insert one or more consecutive headers to the data packet. A state machine may be configured to enable or disable the updating circuit, the removal circuit, and/or the insertion circuit based on the predetermined editing operations. By using the editing circuit, packet deparsing may be performed with less hardware resources and low latency.

18 Claims, 12 Drawing Sheets

(56) References Cited

U.S. PATENT DOCUMENTS

2014/0328344 A1\* 11/2014 Bosshart ................ H04L 45/74
                                                        370/392
2019/0140979 A1\* 5/2019 Levi .................... G06F 13/4068

OTHER PUBLICATIONS

Gibb, Glen at al., "Design principles for packet parsers," in ANCS, 2013, pp. 13-24.
Kozanitis Christos et al., "Leaping multiple headers in a single bound: Wire-speed parsing using the Kangaroo system," in IEEE INFOCOM, 2010, pp. 830-838.
Benacek, Pavel et al., "P4-to-VHDL: Automatic generation of 100 Gbps packet parsers," in 2016 IEEE 24th Annual International Symposium on Field-Programmable Custom Computing Machines (FCCM), May 2016, pp. 148-155.
Santiago Da Silva, Jeferson et al. "P4-compatible High-level Synthesis of Low Latency 100 Gb/s Streaming Packet Parsers in FPGAs," in 26th ACM/SIGDA International Symposium on Field-Programmable Gate Arrays Feb. 25-27, 2018, pp. 1-7.
Specification and drawings for U.S. Appl. No. 15/421,306, filed Jan. 31, 2017, Mohan.

\* cited by examiner

500

STREAMING EDITOR CIRCUIT FOR IMPLEMENTING A PACKET DEPARSING PROCESS

TECHNICAL FIELD

Various embodiments relate generally to packet deparsing.

BACKGROUND

Data represents information that has useful value. Data can take the form of stored information. Data storage can be in analog form. Data storage can also be in digital form. Data in digital format may be communicated between two nodes. When data is communicated, for example, it can be received and interpreted as a function of time. Some systems that receive communicated digitally-formatted data are based on a clock that determines when a voltage signal is sampled to decide whether a symbol in a data stream is, for example, a one or a zero. Sometimes, data is received without knowing its specific phase information. Phase alignments are performed before launching data or receiving data to ensure data accuracy and data integrity.

A packet in transit includes a stack of headers and a data payload. Headers contain information about the data carried by the packet. At an end system, a packet may begin with a stack of Ethernet, Internet Protocol (IP) and Transfer Control Protocol (TCP) headers, for example. In a core network, a packet may begin with a stack of various Carrier Ethernet or MPLS headers, reflecting enroute encapsulation, for example. Header information may be changed during the transit.

SUMMARY

Apparatus and associated methods relating to data packet deparsing include an editing circuit configured to perform one or more predetermined editing operations on headers of an incoming data packet step by step without extracting all headers from the incoming data packet. In an illustrative example, an editor circuit may include an updating circuit configured to receive the data packet and update a header in the data packet. The editor circuit may also include a removal circuit configured to remove a header from the data packet. The editor circuit may also include an insertion circuit configured to insert one or more consecutive headers to the data packet. A state machine may be configured to enable or disable the updating circuit, the removal circuit, and/or the insertion circuit based on the predetermined editing operations. By using the editing circuit, packet deparsing may be performed with less hardware resources and low latency.

Various embodiments may achieve one or more advantages. For example, some embodiments may avoid the need to perform extractions and reconstruction of all defined packet headers during earlier parsing when only a small number of packet headers are to be edited. In some embodiments, the editor circuit may remove pipelining or buffering on side channels of header signals which are unchanged. In various embodiments, using the editor circuit may reduce barrel shifting during editing due to the reduction in sideband signals (e.g., extracted and reconstructed headers).

In one exemplary aspect, an integrated circuit includes a pipelined operation circuit coupled to receive at least a portion of an incoming data packet that comprises a stack of headers and a data payload. The operation circuit is also configured to receive, from an intermediate packet processing circuit, header update information to modify the stack of headers. The operation circuit includes a first editing circuit and a second editing circuit arranged in a sequential pipeline to perform, respectively, a first editing operation on the incoming data packet in a first number of clock cycles, and a second editing operation on the output of the first editing circuit in a second number of clock cycles subsequent to the first number of clock cycles. The integrated circuit also includes a state machine circuit coupled to the first editing circuit to control a first operation of the first editing circuit and coupled to the second editing circuit to control a second operation of the second editing circuit. The first editing operation and the second editing operation edit the stack of headers while the data payload is configured to stream through the operation circuit along with the stack of headers.

In some embodiments, the intermediate processing circuit may include a match-action pipeline circuit configured with a header processing circuit to receive information copied from the data packet by a parser and to generate the updated header information to provide to the editor circuit. In some embodiments, at least one of the first and second editing circuits may include an updating circuit configured to updating a portion of the information in the header stack. In some embodiments, at least one of the first and second editing circuits may include an updating circuit configured to updating a portion of the information in the header stack and a removal circuit configured to remove existing information from the header stack by shifting a portion of the data packet that follows the removed information. In some embodiments, at least one of the first and second editing circuits may include an insertion circuit configured to insert new information into the header stack by shifting a portion of the data packet that follows the inserted information. In some embodiments, at least one of the first and second editing circuits may include a removal circuit configured to remove existing information from the header stack by shifting a portion of the data packet that follows the removed information.

In some embodiments, the integrated circuit may include an identifier circuit configured to determine the editing operations to be performed on the incoming data packet. In some embodiments, the integrated circuit may also include a second operation circuit configured to perform at least a third editing operation. The identifier circuit may be configured to selectively enable one of the first and second operation circuits based upon the determination. In some embodiments, the integrated circuit may include a third operation circuit configured to perform at least a fourth editing operation. The identifier circuit may also be configured to selectively enable one of the first, second, and third operation circuits based upon the determination.

In some embodiments, the sequential pipeline arrangement may include N−2 additional editing circuits arranged consecutively in a sequential pipeline with the first and second editing circuits to perform, respectively, N−2 editing operations on the output of the immediately preceding editing circuit. The state machine circuit may be coupled to each of the N−2 additional editing circuits to control operation of that editing circuit. In some embodiments, the N editing operations are performed on a set of M bits in parallel, and the set of M bits pass through the N sequential editing circuits within 2N+1 clock cycles. In some embodiments, the operation circuit and the state machine circuit may be implemented in an ASIC. In some embodiments, the operation circuit and the state machine circuit may be implemented in programmable logic of a field programmable gate array (FPGA).

In another exemplary aspect, a method to perform data packet deparsing performed in an integrated circuit includes receiving, with a pipelined operation circuit, at least a portion of an incoming data packet that includes a stack of headers and a data payload. The method also includes receiving, with the operation circuit and from an intermediate packet processing circuit, header update information to modify the stack of headers. The operation circuit includes a first editing circuit and a second editing circuit arranged in a sequential pipeline to perform, respectively, a first editing operation on the incoming data packet in a first number of clock cycles, and a second editing operation on the output of the first editing circuit in a second number of clock cycles subsequent to the first number of clock cycles. The method also includes controlling, with a state machine circuit coupled to the first editing circuit, a first operation of the first editing circuit and controlling, with state machine circuit coupled to the second editing circuit, a second operation of the second editing circuit. The method also includes editing, by the first editing operation and the second editing operation, the stack of headers while the data payload is configured to stream through the operation circuit along with the stack of headers.

In some embodiments, the method may also include updating, with at least one of the first and second editing circuits comprising an updating circuit, a portion of the information in the header stack. In some embodiments, the method may also include inserting, with at least one of the first and second editing circuits comprising an insertion circuit, new information into the header stack by shifting a portion of the data packet that follows the inserted information. In some embodiments, the method may also include removing, with at least one of the first and second editing circuits comprising a removal circuit, existing information from the header stack by shifting a portion of the data packet that follows the removed information. In some embodiments, the method may also include performing, with the sequential pipeline arrangement further comprising N−2 additional editing circuits arranged consecutively in a sequential pipeline with the first and second editing circuits, respectively, N−2 editing operations on the output of the immediately preceding editing circuit; and, controlling, with the state machine circuit 345 further coupled to each of the N−2 additional editing circuits, operation of each of the N−2 additional editing circuits. In some embodiments, the method may also include performing the N editing operations on a set of M bits in parallel, wherein the set of M bits pass through the N sequential editing circuits within 2N+1 clock cycles. In some embodiments, the first and second editing operations may be generated in response to user-input description in a high-level language.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
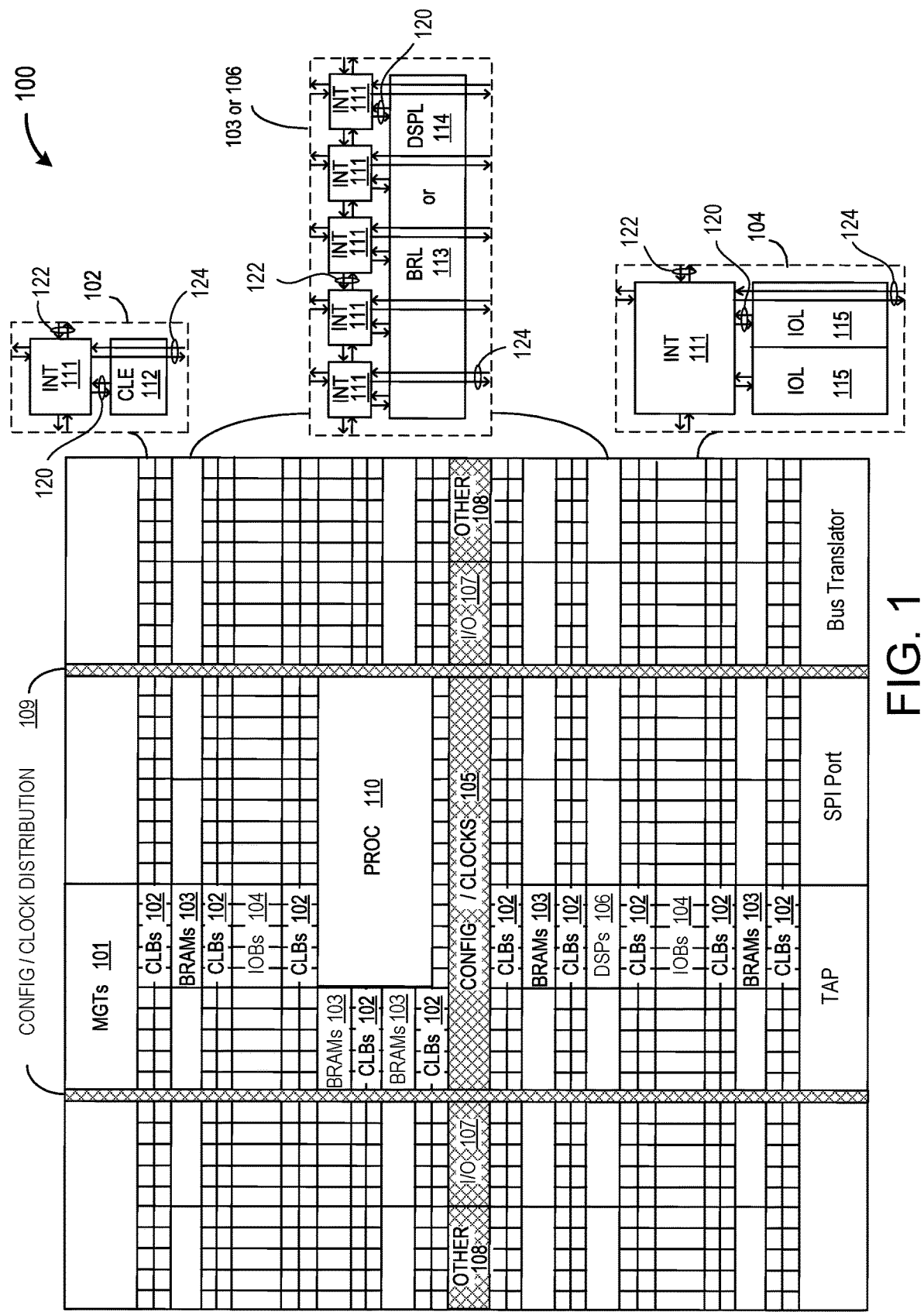
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Programmable ICs may be deployed in a range of applications. The programmable logic capabilities of an FPGA may provide significant advantages in applications such as, for example, communications. By way of example, an FPGA may be programmed to process packet-based communications between networked devices. In some implementations, a network device may examine fields in packet headers to decide what to do with each packet. For example, a router may examine the internet protocol (IP) destination address to decide where to send the packet next. A firewall may compare several fields against an access-control list to decide whether to drop a packet. Parsing may include the process of identifying and extracting the appropriate header fields in a packet header. Deparsing may include the process of updating the appropriate header fields and reassembling the packet headers and data payload into an outgoing data packet. In various embodiments described herein, Field programmable gate arrays (FPGAs) may be used to implement a high-speed programmable packet processing.

Figure 2:
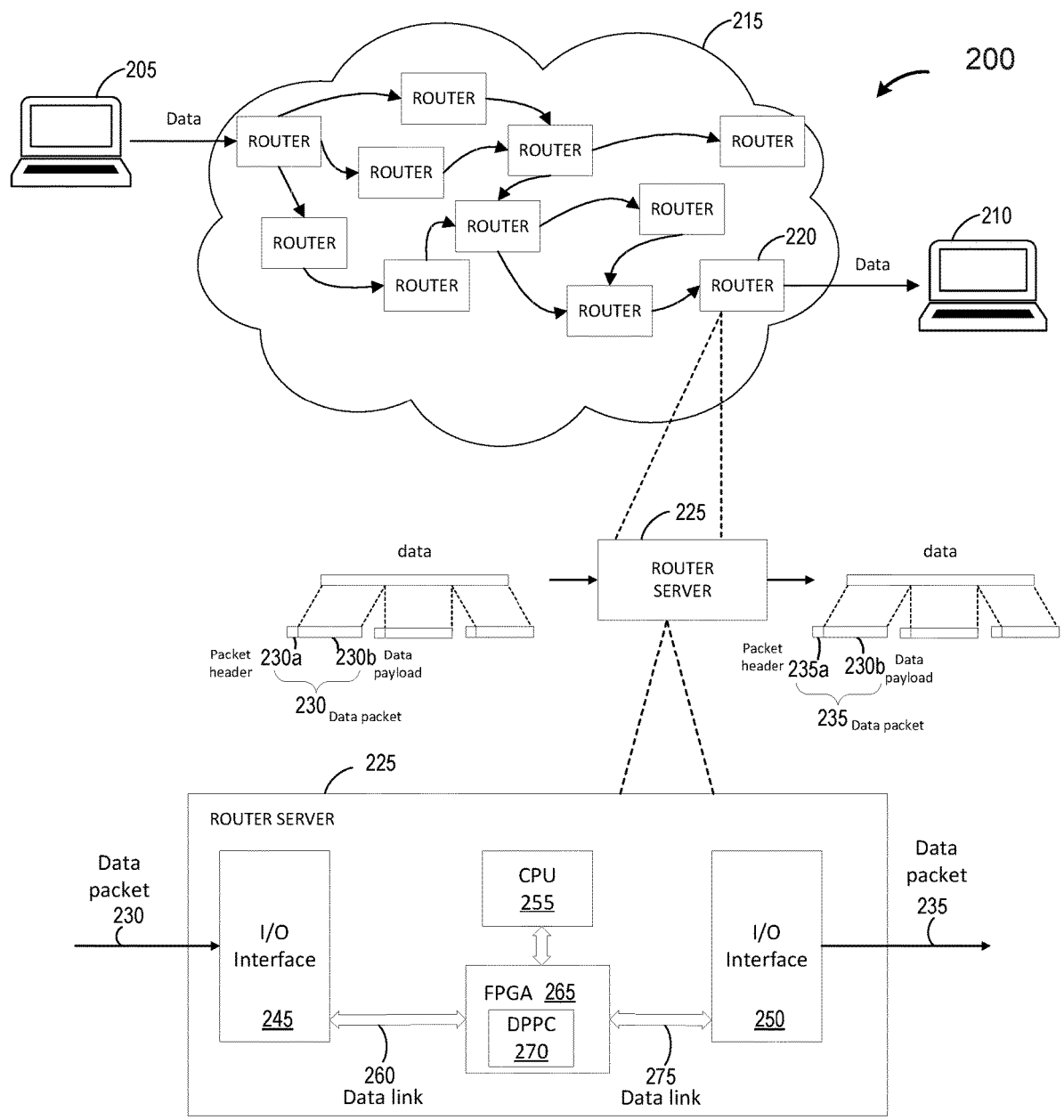
FIG. 2 depicts an exemplary router server implemented in a communication system.

FIG. 2 depicts an exemplary router server implemented in a communication system. When data transfers from a first telecommunication device 205 to a second telecommunication device 210, the data are forwarded by a network 215 of interconnected routers 220. The routers 220 are used to forward data packets between the telecommunication devices 205, 210. The router 220 may, for example, read information in the data packet to determine the next destination (e.g., a network address of the second telecommunication device 210). In the depicted example, the router 220 includes a router server 225. The router server 225 may read network address information in the data packet to find the ultimate destination. Data may be divided into data packets to be transferred between different routers. In this depicted example, data is divided into three data packets. Each data packet (e.g., data packet 230) includes a packet header 230*a* and a data payload 230*b*. The packet header 230*a* may be extracted and modified by the router server 225 to send to the next destination. For example, the packet header 230*a* becomes a new packet header 235*a*. The new packet header 235*a* and the data payload 230*b* forms a new data packet 235.

The router server 225 includes a first I/O interface 245 coupled to receive the incoming data packet 230, and a second I/O interface 250 coupled to output the new data packet 235. The router server 225 further includes a central processing unit (CPU) 255, a data link 260 coupled to transfer data from the I/O interface 245 to an FPGA 265 configured with a Data Packet Processing Circuit (DPPC) 270, and a data link 275 coupled to transfer data from the FPGA 265 to the I/O interface 245. When the data packet 230 is transmitted to the router server 225, the router server 225 accepts the data packet 230 through the first I/O interface 245. The data packet 230 may then be detected by the CPU 255, which may monitor and/or provide control or auxiliary functions in support of the packet processing. In some example, the CPU 255 may offload the packet processing by instructing a field programmable gate array (FPGA) 265 to identify the data packet 230 and perform the processing operations that modify the header 230*a* into the header 235*a*. The data packet 230 is then allocated to the FPGA 265, which is configured with the data packet processing circuit (DPPC) 270. The DPPC 270 parses, processes, and deparses the data packet 230 and sends the processed data packet 235 to the second I/O interface 250 to the next destination.

Figure 3:
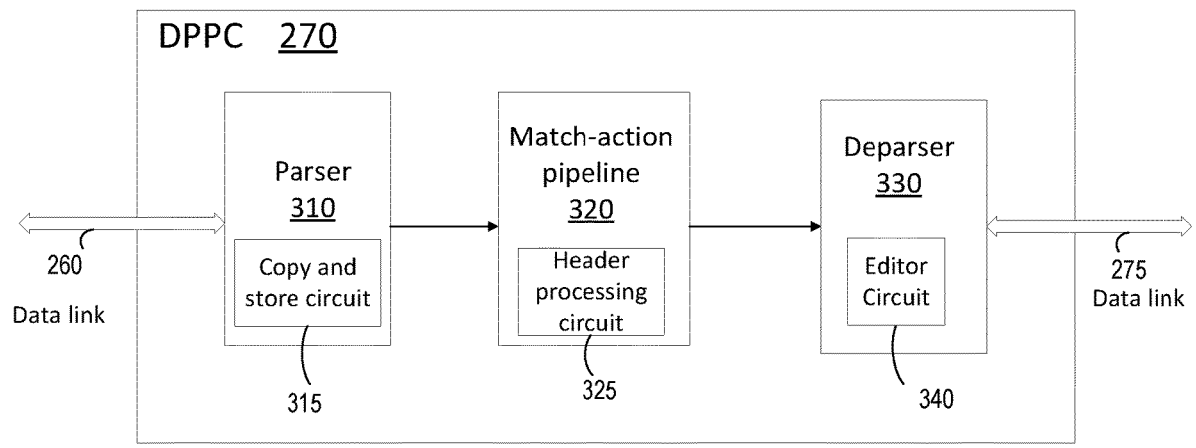
FIG. 3 depicts an exemplary data packet processing circuit (DPPC) implemented in an FPGA of the router server in FIG. 2.

FIG. 3 depicts an exemplary data packet processing circuit (DPPC) implemented in an FPGA of the router server in FIG. 2. A data packet processing circuit (DPPC) (e.g., the DPPC 270 in FIG. 2) includes a parser 310. The parser 310 may accept a data packet (e.g., the data packet 230) and extract header fields information from the data packet (e.g., the data packet 230). In this depicted example, the parser 310 includes a copy and store circuit 315. The copy and store circuit 315 identifies headers to be modified and only copies the identified headers from a data packet (e.g., the data packet 230) without extracting all headers in the data packet. The copied headers are then stored for future processing.

The DPPC 270 also includes a match-action pipeline circuit 320. The match-action pipeline circuit 320 may be configured to receive the copied headers and process those copied headers. In this depicted example, the match-action pipeline circuit 320 includes a header processing circuit 325. The header processing circuit 325 processes the copied headers extracted from the parser circuit 310 and generates new headers. For example, in a packet with headers A, B and C, the header processing circuit 325 may change information contained in header A. In another example, the header processing circuit 325 may also insert two more headers.

The DPPC 270 also includes a deparser 330. The deparser 330 is configured to receive the new headers and re-form the new headers into the data packet (e.g., the data packet 230) to form a new ongoing data packet (e.g., the data packet 235). The deparser 330 includes an editor circuit 340. The editor circuit 340 receives the new headers and may be configured to modify the data packet headers with new headers to form an outgoing data packet (e.g., the data packet 235). In some embodiments, the DPPC 270 may be implemented on a non-programmable logic (e.g., ASIC). In some embodiments, the deparser 330 may be implemented on a non-programmable logic (e.g., ASIC). In some embodiments, the editor circuit 340 may be implemented on a non-programmable logic (e.g., ASIC). An example of the editor circuit 340 is described in further detail with reference to FIG. 6.

Figure 4A:
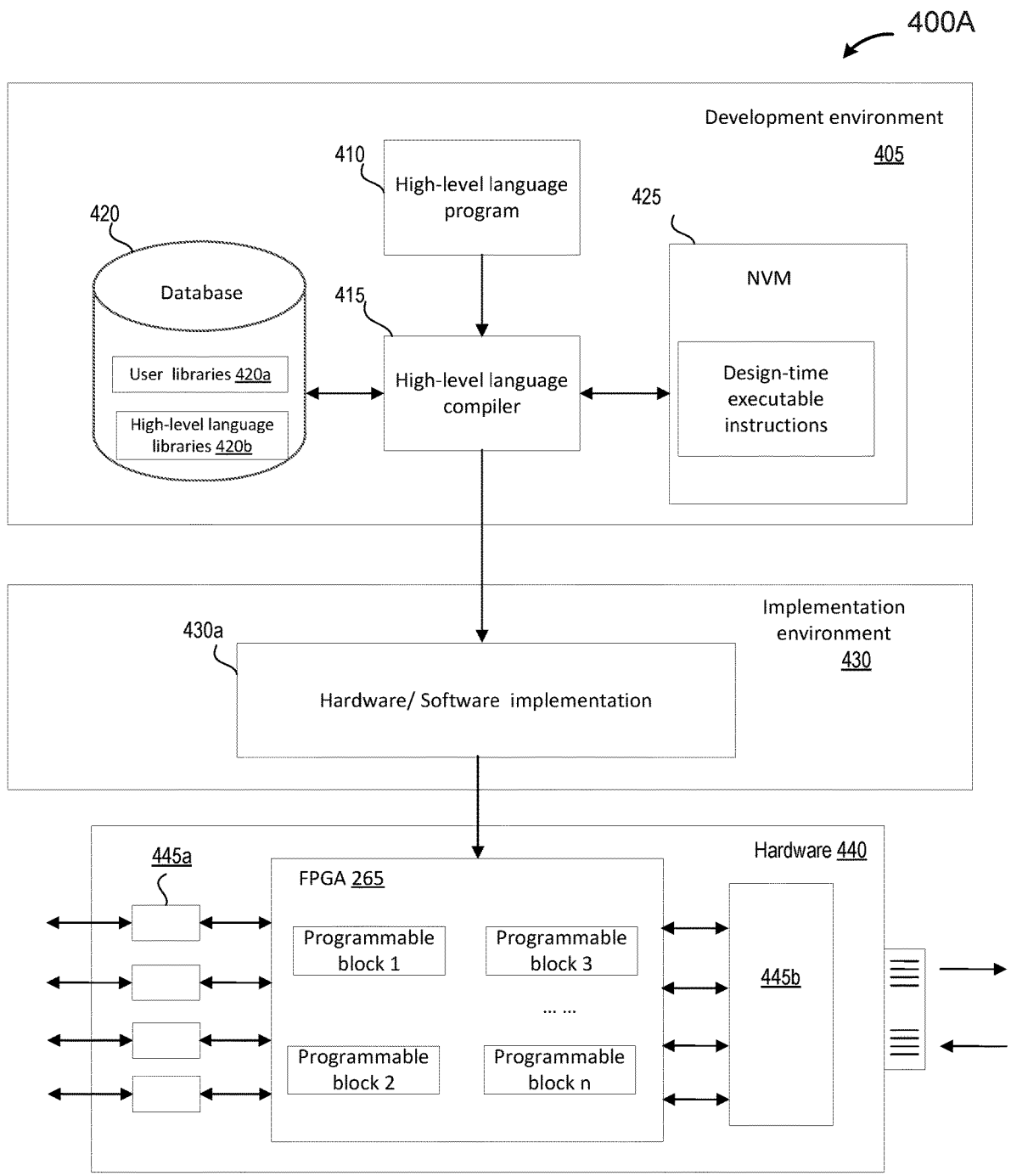
FIG. 4A depicts a generalized system to compile instructions in a high-level language to configure programmable logic blocks.
Figure 4B:
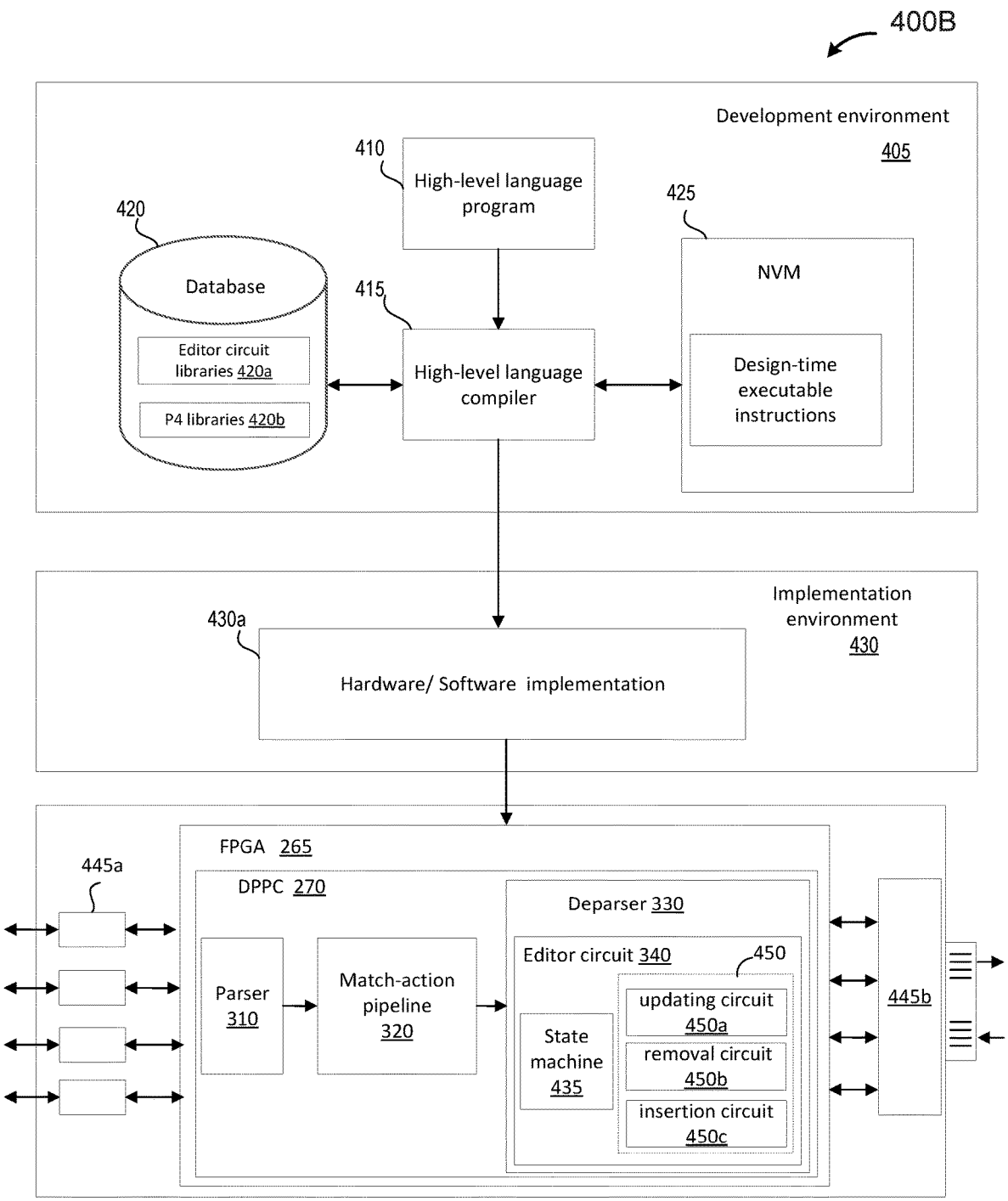
FIG. 4B depicts a system to compile deparsing instructions in a high-level language to configure programmable logic blocks for packet editing.

FIGS. 4A-4B each depict a block diagram of an exemplary system to use a high-level language representation to implement packet deparsing in a hardware streaming pipeline architecture. Specifically, FIG. 4A depicts a generalized system to compile instructions in a high-level language (HLL) to configure, for example, programmable logic blocks.

A configuration system 400A includes a development environment 405. The development environment 405 includes a user interface for development using a HLL program 410. A user may use a high-level language (HLL) (e.g., P4 language) to generate, at design time, instructions that can produce, via RTL generation at compile time, a hardware pipeline architecture that, at run-time, can perform user-specified functions using the FPGA 265. The development environment 405 also includes a HLL compiler 415. The HLL compiler 415 connects with the HLL program 410 and a database 420. In this depicted example, the database includes user libraries 420a, which may define data structures associated with editor circuitry, may further include HLL libraries 420b. The HLL compiler 415 may select available library files in the database 420 to compile HLL commands into one or more sets of instructions, which may also be referred to as data structures. During development, the sets of instructions are stored in a data store or NVM 425 (non-volatile memory).

The configuration system 400A also includes an implementation environment 430. An implementation engineer may employ some compiler tools to convert the instructions stored in the NVM 425 into hardware/software implementations 430a (e.g., RTL (register transfer logic)) that can be loaded via a bitstream, for example, into a target device such as the FPGA 265, for example. In some embodiments, the implementation environment 430 may generate the data to realize fixed hardware (e.g., in an ASIC) in accordance with the design specified by, for example, the user-input high level language programming in the development environment 405.

The configuration system 400A also includes a hardware environment 440. The hardware environment 440 may include a line card. In some embodiments, the hardware environment 440 may include a network interface card (NIC). In this depicted example, the hardware environment 440 includes a number of buffers 445a (e.g., which may form the I/O interface 245) that connect external signals into an FPGA (e.g., the FPGA 265). In the depicted example, the FPGA 265 includes various programmable logic blocks that represent programmable hardware resources available to realize circuitry in accordance with the design specified by, for example, the user-input high level language programming in the development environment 405. The FPGA 265 also connects with other devices 445b.

FIG. 4B depicts a particularized system configured to compile deparsing instructions in a high-level language to configure programmable logic blocks for packet editing. A configuration system 400B includes the development environment 405 for design development using the HLL program 410. A user may use a HLL (e.g., P4 language) to generate, at design time, instructions that can produce, via RTL generation at compile time, a hardware pipeline architecture that, at run-time, can deparse a stream of packets using the FPGA 265. In this depicted example, the database 420 includes one or more editor circuit libraries in the user libraries 420a, and one or more P4 libraries in the HLL libraries 420b.

The FPGA 265 may be configured to implement a data packet processing circuit (e.g., the DPPC 270). The DPPC 270 includes the parser 310, the match-action pipeline 320, and the deparser 330. The deparser 330 includes an editor circuit (e.g., the editor circuit 340). In this depicted example, the editor circuit 340 includes an operation circuit 450. The operation circuit 450 is configured to perform data packet deparsing operations. The operations may be pre-determined, at design time, by the user before generating RTL to implement the deparsing circuitry in a target device, such as the FPGA 265.

The operation circuit 450 may include one or more updating circuits 450a, one or more removal circuits 450b, and/or one or more insertion circuits 450c. Each of the updating circuits 450a, the removal circuits 450b and the insertion circuits 450c may be designed to perform a pre-determined operation. For example, the updating circuit 450a may be configured to modify a header without changing the header's size. For example, the removal circuit 450b may be configured to remove a header in the data packet 230. The insertion circuit 450c may be configured to insert one or more new headers into the data packet. In some embodiments, when there are multiple headers requiring updating operations, multiple updating circuits may be needed. Different headers may have different criteria for when the updating circuits may be enabled. The updating circuits may also be different, depending on the header sizes they are operating on and on the possible positions where the header may occur within a data packet. In some embodiments, two or more insertion operations may share an insertion circuit. For example, an operation defined in a HLL may specify insertion of two consecutive new headers. The two new headers may be grouped and implemented into a single insertion circuit even if they are specified as two separate headers in the high-level language.

The editor circuit 340 also includes a state machine 435. The state machine circuit 435 controls the operation circuit 450. The state machine 435 may enable or disable the one or more updating circuits 450a, one or more removal circuits 450b, and/or one or more insertion circuits 450c in the operation circuit 450. An example of the updating circuit 450a is described in further detail with reference to FIG. 7A. An example of the insertion circuit 450c is described in further detail with reference to FIG. 7B.

In some embodiments, a user may use the HLL to define information on what operations are required and what rules should be applied with regard to deparsing data packets. In some embodiments, the HLL may specify the packet formats of interest, and how various types of packets should be processed. With reference to FIG. 3, some embodiments of the DPPC 270 may operate the parser 310, for example, to identify the different types of packet headers present in a data packet. In an illustrative example, deparsing operations may be a function of the header sequencing and/or field values extracted by the parser 310. By way of example, and not limitation, the editor circuit 340 in the deparser 330 may include an update circuit for header A, and the update circuit may be enabled only when header A is present in an incoming data packet. In some embodiments, the match-action pipeline 320 may operate with a lookup table to perform a lookup of a destination address extracted from a packet header. If a match is found in the lookup table, a corresponding circuit may be enabled to perform a corresponding operation in the editor circuit 340. For example, an insertion circuit for a header C may be enabled.

In some embodiments, a user using the HLL at design time and operating in the development environment 405 may specify how headers are to be modified, for example. The specified header modification may include insertion, updating and/or removal of one or more headers or header fields in a packet. A processor may determine whether the hardware editor circuit 340 is configured to perform the required packet deparsing operations more efficiently than the CPU or other available processor systems. For example, efficiency may be improved if the deparsing function can be offloaded from the processor to the streaming hardware pipeline architecture of the editor circuit 340, for example, which may advantageously achieve better utilization of programmable logic resources, reduce computational load, power and/or latency, or otherwise optimize use of available computational resources. In some implementations, efficiency may be improved when latency can be reduced by offloading from memory intensive, processor-based software control to streaming hardware-accelerated embodiments adapted to perform deparsing operations using the editor circuit 340.

Figure 5:
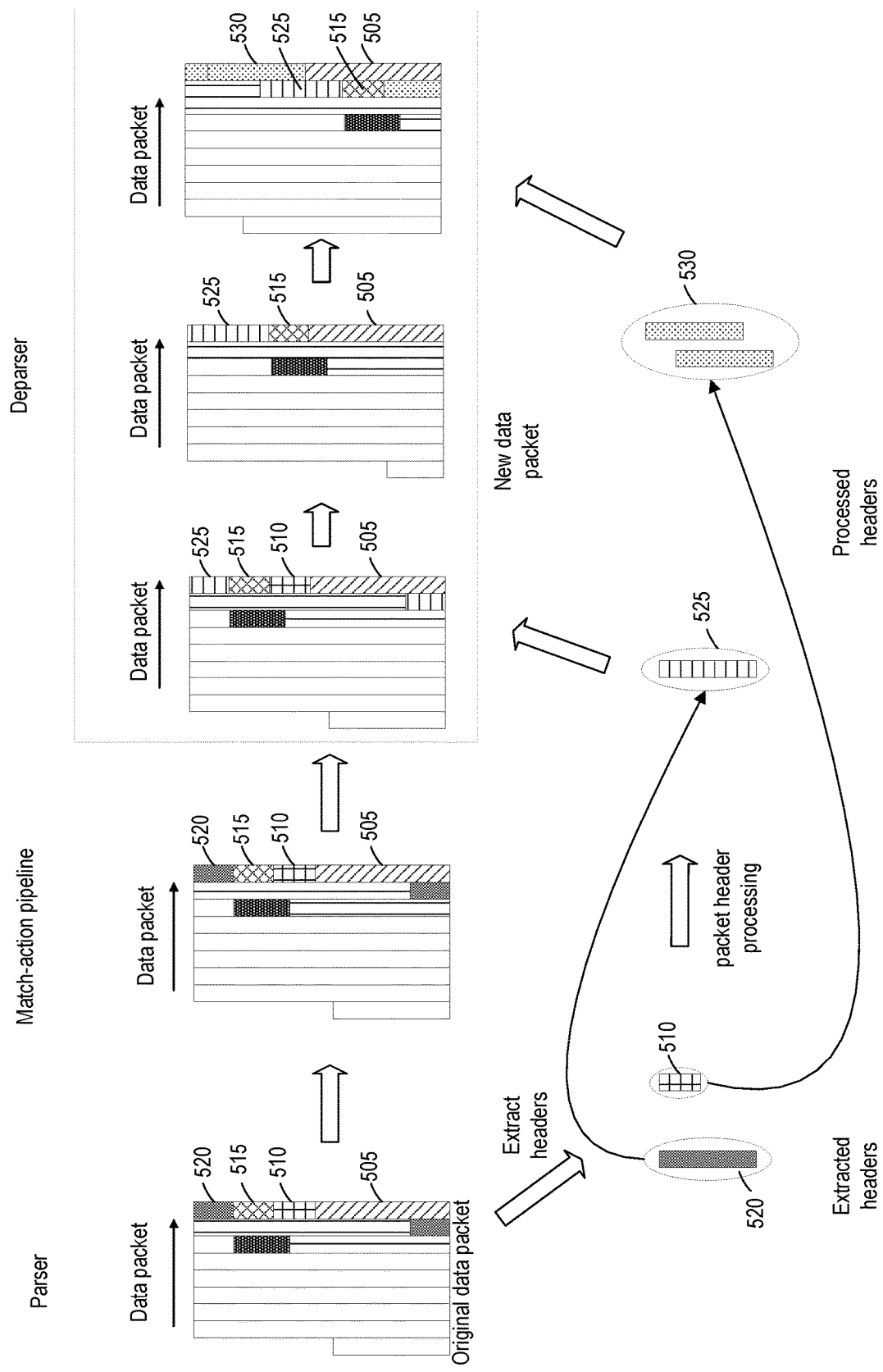
FIG. 5 depicts exemplary operations performed in the data packet processing circuit (DPPC).

FIG. 5 depicts exemplary operations performed in the data packet processing circuit (DPPC). With reference to FIG. 2, an incoming data packet (e.g., the data packet 230) is transmitted to the DPPC 270. The original data packet includes a packet header and a data payload. During the parsing and deparsing process, the packet header and the data payload may remain attached together without separation in some embodiments.

The packet header includes a header 505, a header 510, a header 515 and a header 520. In this depicted example, the header 520 needs to be updated and the header 510 needs to be replaced by two new headers.

During parsing, the header 510 and the header 520 are copied from the original data packet. The two copied headers 510 and 520 are processed in the match-action pipeline circuit 320. More specifically, the header 520 is updated into a header 525 with the same size. In some embodiments, the header 520 may be updated according to a P4 specified functionality. The header 510 needs to be removed from the original data packet and two new headers 530 need to be inserted to the original position of the header 510. After processing by match-action pipeline 320, the new headers 525 and 530 are prepared and the original data packet is sent to the editor circuit 340 for deparsing in a sequential, pipelined process. The new header 525 replaces the header 520 in the data packet by employing the updating circuit 450a. After that, the header 510 is removed from the data packet by employing the removal circuit 450b. And the new headers 530 are inserted to the data packet by employing the insertion circuit 450c.

Figure 6:
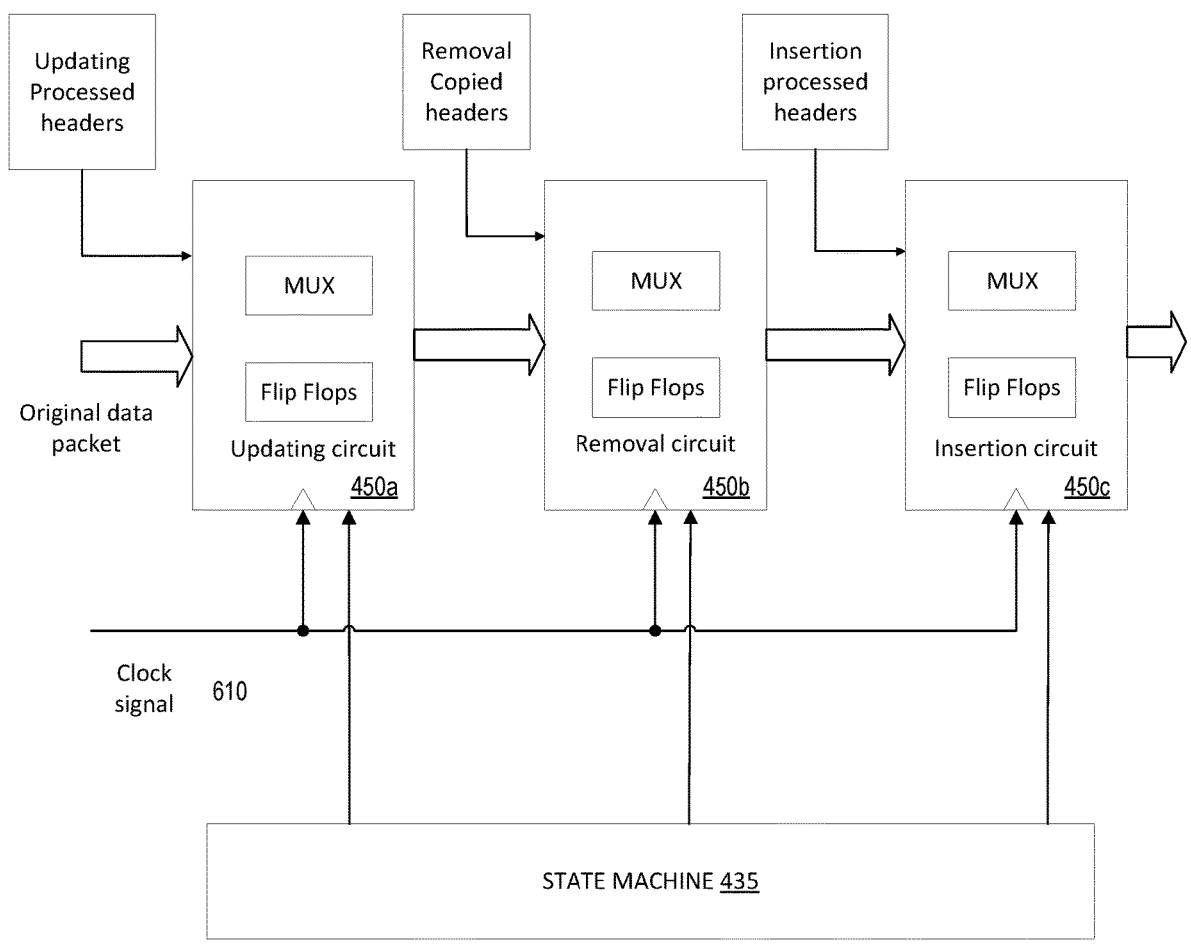
FIG. 6 depicts an exemplary editor circuit used in the DPPC to edit headers in the data packet.

FIG. 6 depicts an exemplary editor circuit used in the DPPC to edit headers in the data packet. In some implementations, the editor circuit 340 may be implemented by carrying out basic editing operation stages in sequence and each operation may take place on the packet stream. In this depicted example, the editor circuit 340 is configured to perform an update operation and a replace operation. Header 520 is modified in the first editing stage, header 510 is removed in the second editing stage, and header 530 is inserted in the finial editing stage. The editor circuit 340 includes an updating circuit (e.g., the updating circuit 450a). The updating circuit 450a receives an original data packet (e.g., the data packet 230) and an updating processed header from the match-action pipeline circuit 320. The updating circuit 450a includes one or more logic gates and multiplexers that are designed to update a predetermined header (e.g., the header 520) with the updating processed header (e.g., the header 525). The one or more logic gates in the updating circuit are fed by a clock signal 610. An example of the updating circuit 450a is described in further detail with reference to FIG. 7A.

The editor circuit 340 also includes a removal circuit (e.g., the removal circuit 450b). The removal circuit 450b receives a predetermined removal copied header (e.g., the header 510) and an updated data packet from the updating circuit 450a. The removal circuit 450b also includes one or more logic gates and multiplexers that are designed to remove the header 510 from the updated data packet. The one or more logic gates in the removal circuit 450b are fed by the clock signal 610.

The editor circuit 340 also includes an insertion circuit (e.g., the insertion circuit 450c). The insertion circuit 450c receives an insertion processed header (e.g., the header 530) from the match-action pipeline circuit 320 and receives a removed data packet from the removal circuit 450b. The insertion circuit 450c also includes one or more logic gates and multiplexers that are designed to insert the insertion processed header (e.g., the header 530) into the removed data packet. The insertion processed header is inserted to replace the predetermined removal copied header (e.g., the header 510). The one or more logic gates in the insertion circuit 450c are fed by the clock signal 610. An example of the insertion circuit 450c is described in further detail with reference to FIG. 7B.

In some embodiments, the updating processed header, the removal copied header, and the insertion processed header may be stored in three different registers. In some embodiments, the updating processed header, the removal copied header, and the insertion processed header may be stored in a memory.

The editor circuit 340 also includes a state machine circuit (e.g., the state machine circuit 435). The state machine circuit 435 may include control logic configured to control the cooperative operations of the updating circuit 450a, the removal circuit 450b, and the insertion circuit 450c. More specifically, the state machine circuit 435 selects outputs of the multiplexers in the updating circuit 450a, the removal circuit 450b, and the insertion circuit 450c.

Figure 7A:
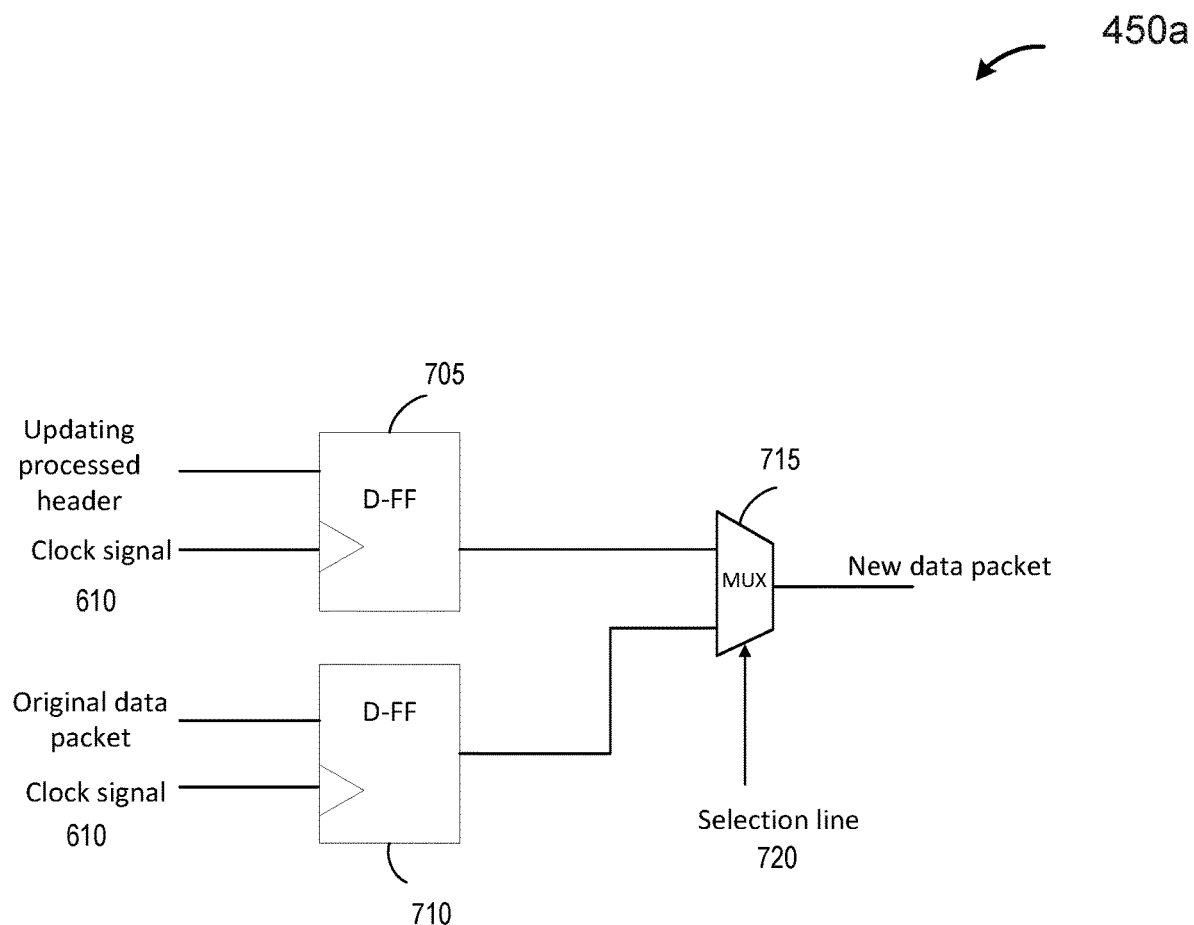
FIG. 7A depicts an exemplary updating circuit implemented in the editor circuit.

FIG. 7A depicts an exemplary updating circuit implemented in the editor circuit. In this depicted example, an updating circuit (e.g., the updating circuit 450a) includes a first D-type flip flop 705. The first D-type flip flop 705 receives an updating processed header (e.g., the header 525). The first D-type flip flop 705 feeds by a clock signal (e.g., the clock signal 610). The updating circuit 450a also includes a second D-type flip flop 710. The second D-type flip flop 710 receives an original data packet (e.g., the original data packet 230). The second D-type flip flop 710 also feeds by the clock signal 610.

The updating circuit 450a also includes a two-input multiplexer 715. The multiplexer 715 receives outputs from the two D-type flip flops 705, 710. The two-input multiplexer 715 also includes a selection line 720. The selection line 720 is controlled by the state machine circuit 435 to select one of the outputs from the two D-type flip flops 705, 710 as an output. In some embodiments, other logic gates may be used to replace the first D-type flip flop 705 and/or the second D-type flip flop 710.

In a simplified illustrative example involving the case of a serial data line, the original data packet may include header A, header B, header C, and a data payload. Header A is 4 bits, header B is 3 bits, and header C is 5 bits. Header B is predetermined to update into header X with the same size. Header X is stored in the first D-type flip flop 705. The clock signal transfers one bit every clock cycle. In the first four clock cycles, the selection line 720 is controlled to output data from the second D-type flip flop 710. In the next three clock cycles, the selection line 720 is controlled to output data from the first D-type flip flop 705. In the next five clock cycles, the selection line 720 is controlled to output data from the second D-type flip flop 710. By controlling the selection line, an updated data packet with header A, header X and header C is obtained. In some embodiments, parallel data buses may be used to support higher data rates (e.g., ranging from 32-bit to 1024-bit wide). An example of implementing an editor circuit using parallel data buses is described in further detail with reference to FIG. 8.

Figure 7B:
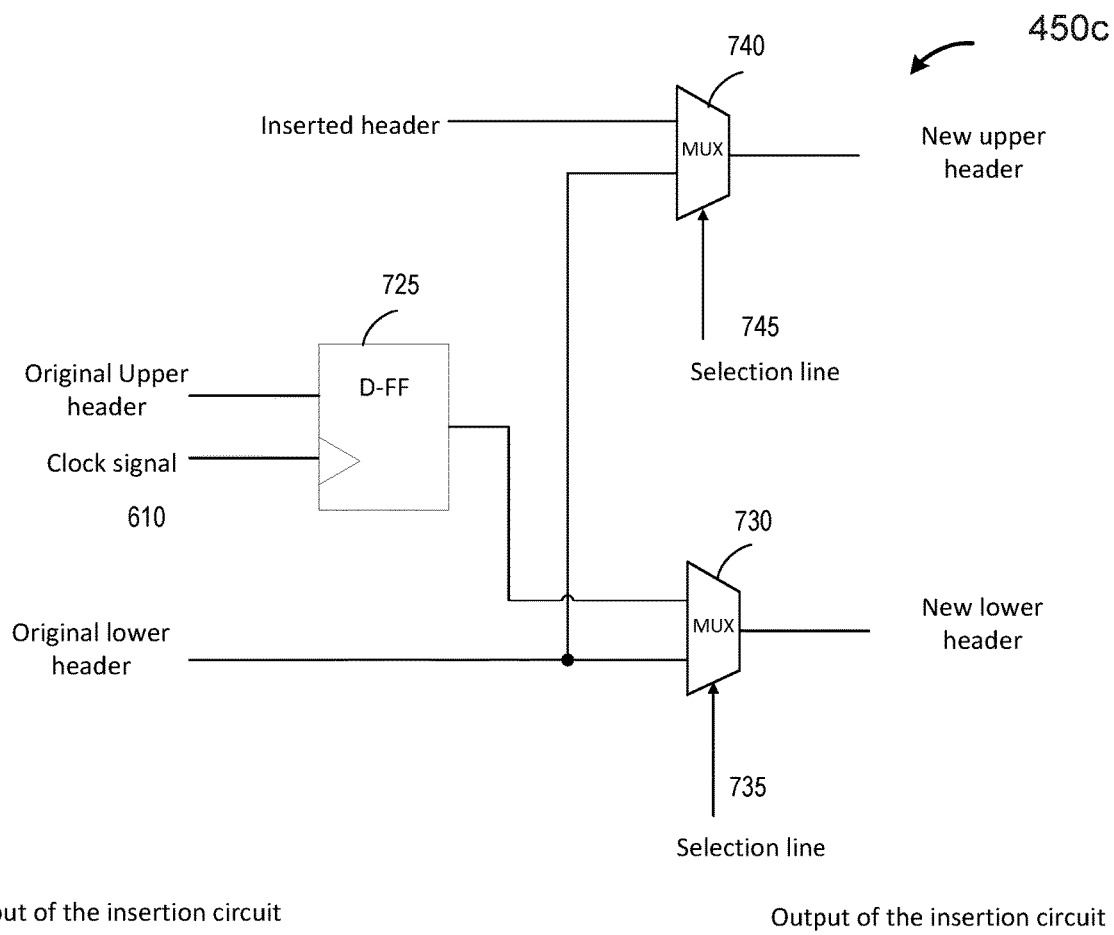
FIG. 7B depicts an exemplary insertion circuit implemented in the editor circuit.

FIG. 7B depicts an exemplary insertion circuit implemented in the editor circuit. In this depicted example, each header may have a bit width that is half of a word in the data packet. For example, each word is 16 bits and each header is 8 bits. The data packet has headers ABCDEFGH. A header X is inserted to a data packet between header A and header B. The insertion circuit 450c includes a D-type flip flop (FF) 725. The FF 725 receives original upper headers in the data packet (e.g., header B, D, F, H). The insertion circuit 450c also includes a first multiplexer 730 configured to receive the output of the FF 725. The first multiplexer 730 also receives original lower headers in the data packet (e.g., header A, C, E, G). The first multiplexer 730 includes a selection line 735. The selection line 735 is controlled by the state machine 435 to output only one bit at a clock cycle. The insertion circuit 450c also includes a second multiplexer 740 configured to receive the insertion processed header X and the original lower headers (e.g., header A, C, E, G). The second multiplexer 740 also includes a selection line 745. The selection line 745 is controlled by the state machine 435 to output only one bit at a clock cycle.

When the data packet comes into the insertion circuit, at the first clock cycle, the selection line 735 selects header A to be output by the first multiplexer 730 and the selection line 745 selects header X to be output by the second multiplexer 735. In the second clock cycle, the selection line 735 selects header B to be output by the first multiplexer 730 and the selection line 745 selects header C to be output by the second multiplexer 735. In the third clock cycle, the selection line 735 selects header D to be output by the first multiplexer 730 and the selection line 745 selects header E to be output by the second multiplexer 735. After a number of clock cycles, a new data packet with header X inserted is obtained by controlling the selection line 735 and the selection line 745.

Figure 8:
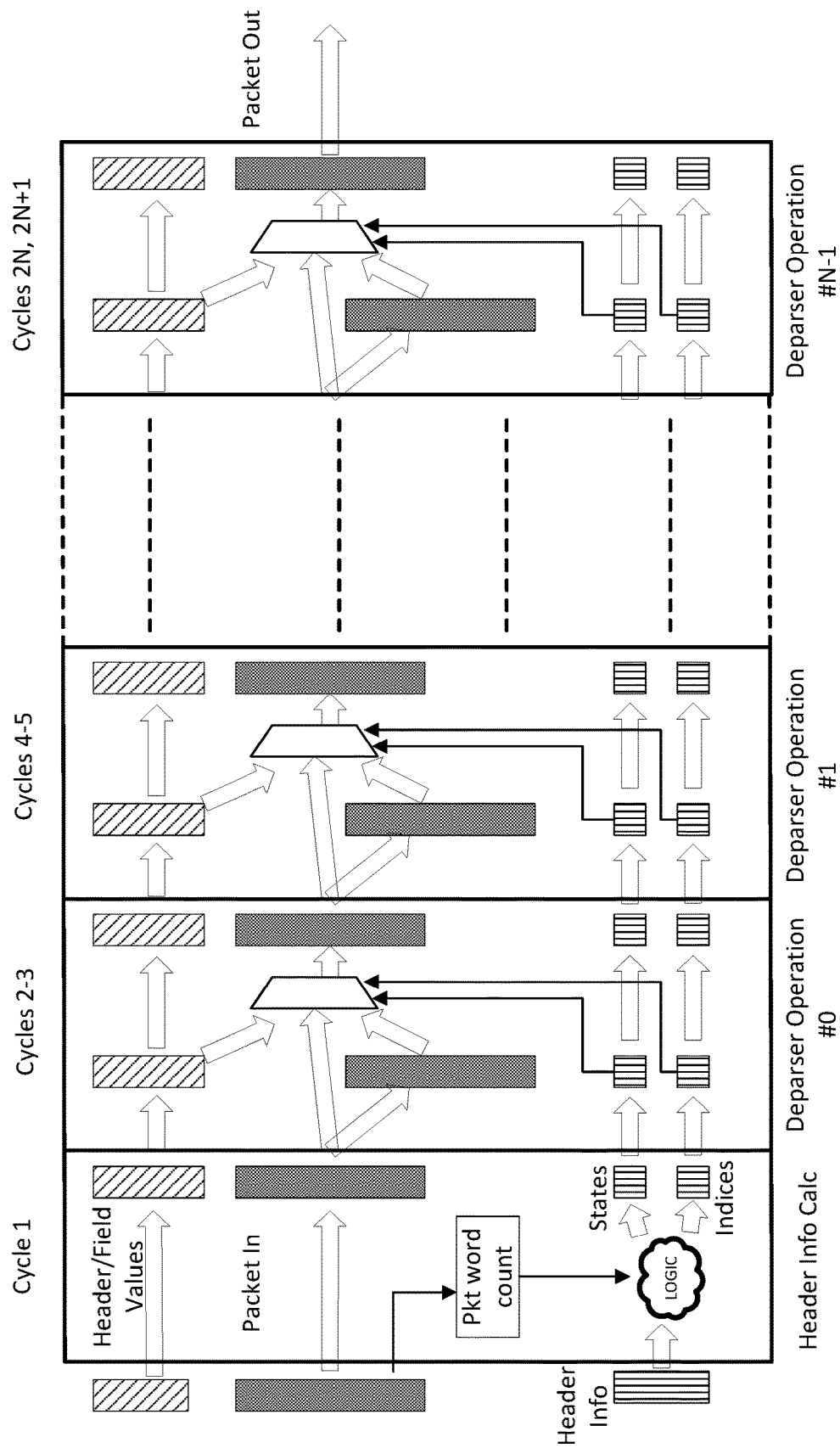
FIG. 8 depicts an exemplary editor circuit implemented with parallel data buses.

FIG. 8 depicts an exemplary editor circuit implemented with parallel data buses. In this depicted example, a data packet including a packet header and a data payload is received by an editor circuit. The editor circuit may be configured with a parallel interface to receive the data packet through parallel data buses. In some embodiments, the editor circuit may receive bits in a wide range (e.g., from 32 bits to at least 1024 bits). The editor circuit includes many operation circuits connected in series to perform consecutive operations on the data packet. For example, in a first clock cycle, extracted headers, the data packet, and processed new headers are received by the editor circuit. In the second clock cycle and the third clock cycle, a header in the data packet that is extracted may be updated by an updating circuit to a new processed header. After 2N clock cycles, all predetermined operations are performed. A new data packet is formed with modified headers and the original data payload may be ready to send to the next destination.

Figure 9:
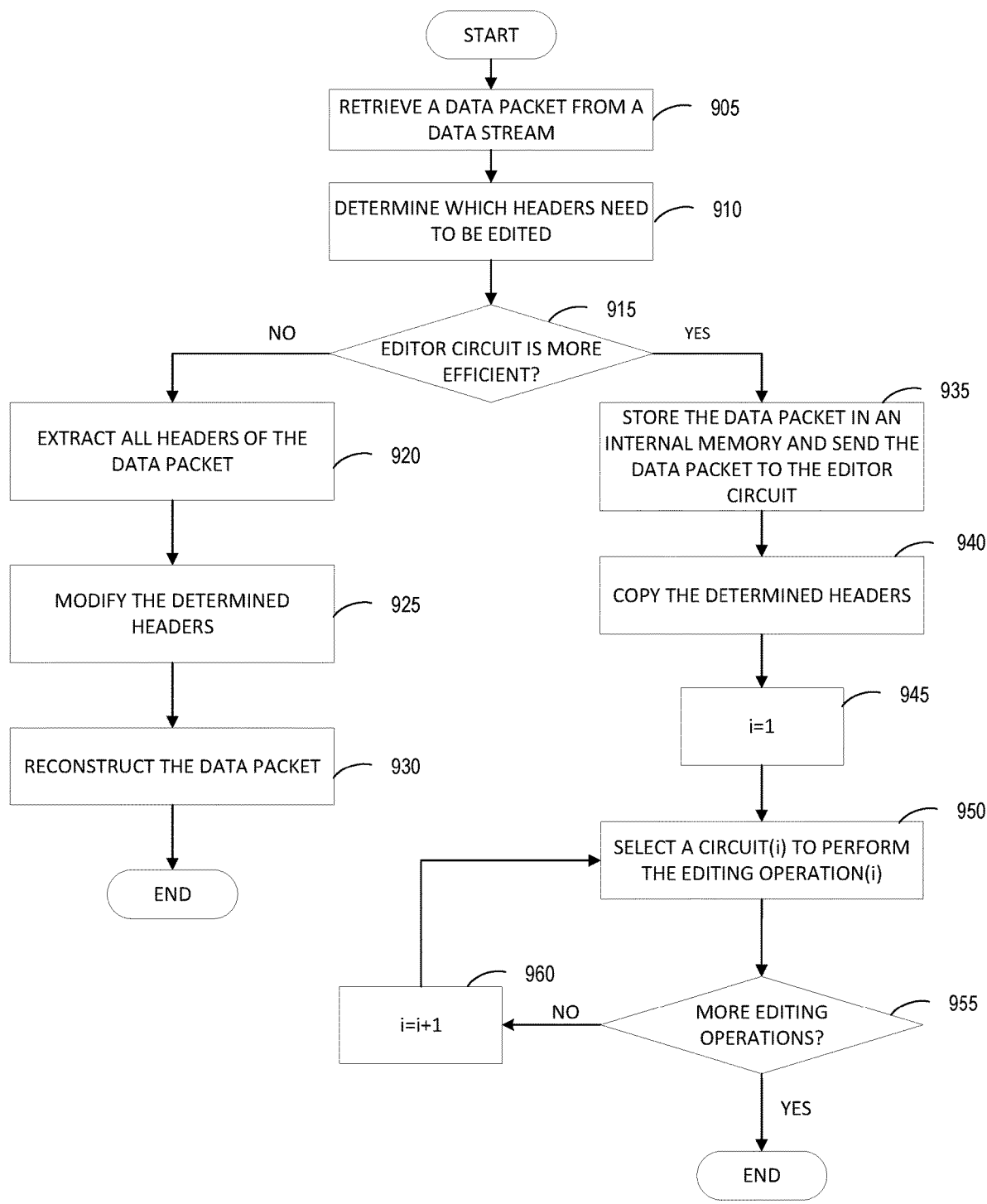
FIG. 9 depicts an exemplary flow chart of a method to implement the editor circuit.

FIG. 9 depicts an exemplary flow chart of a method to implement the editor circuit. At 905, a data packet is received by the processor. At 910, the processor determines which headers need to be edited based on the users' instruction. At 915, the processor decides whether the received data packet can be processed by the editor circuit formed in the FPGA. For example, if the reconfigured editor circuit may perform updating header A to header M, removing header C and removing header E, then the processor may identify the editor circuit is suitable to edit the headers in the received data packet. If the received data packet needs other modifications that are different from the editor circuit's function, then the processor may identify the editor circuit is not suitable to edit the headers in the received data packet.

When it is not suitable to use the editor circuit, at 920, all headers in the received data packet are extracted in the first pipeline circuit. The received data packet is divided into a header packet and a data payload. At 925, headers in the header packet are modified in the first pipeline circuit. At 930, the modified header packet is combined with the data payload to reconstruct a data packet for outgoing transmitting.

When it is suitable to use the editor circuit, at 935, the received data packet is stored in the internal memory and sent to the editor circuit. At 940, the received data packet is still a whole data packet and only headers that need to be modified are copied from the data packet. For example, only header A, header C and header E are copied. The copied headers may then be processed by a match-action pipeline circuit. For example, header A may become header M. At step 945, the state machine introduces a variable i and initialize i equals to 1. At 950, corresponding circuits are used to process corresponding editing operations. For example, header M may be sent to the updating circuit. At 955, if not all editing operations are finished, then the state machine increments the variable i at 960 and loops back to 950, and a next editing operation is performed by a next corresponding circuit. For example, a first removal circuit may be used to remove header C. A second removal circuit may be used to remove header E. If all editing operations are performed, then the data packet is ready for outgoing transmitting.

Figure 10:
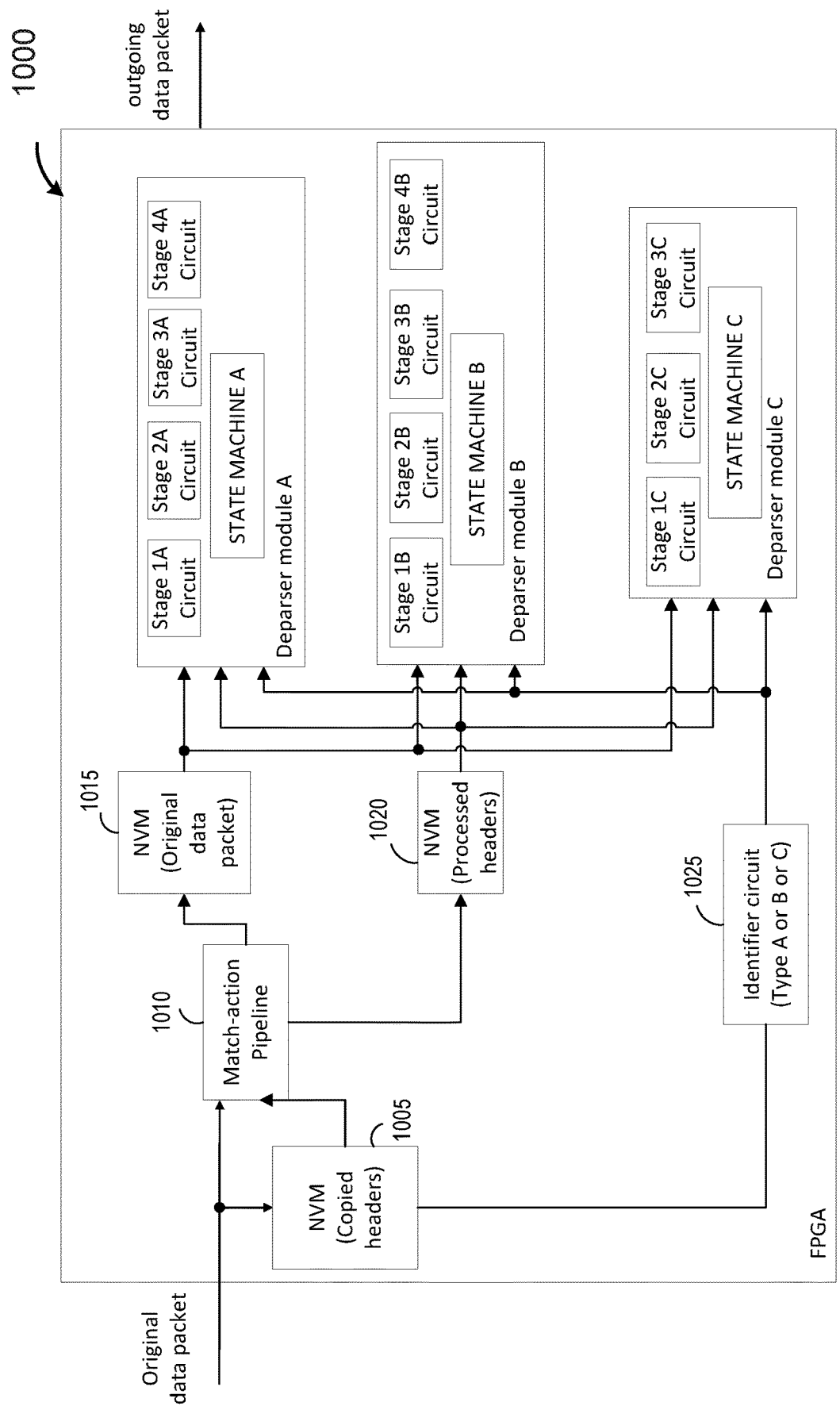
FIG. 10 depicts another exemplary system used in the DPPC to edit headers in the data packet.

FIG. 10 depicts another exemplary system used in the DPPC to edit headers in the data packet. A system 1000 includes a first memory 1005 to store copied headers to be processed. The system 1000 also includes a match-action pipeline circuit 1010. The received data packet and the copied headers are received by the match-action pipeline 1010. The system 1000 also includes a second memory 1015 to store the original data packet and a third memory 1020 to store the processed headers.

The system 1000 also includes two or more deparser modules. Each deparser module includes an editing circuit that is reconfigured to perform a series of predetermined modification. In this depicted example, the system 1000 includes a deparser module A, a deparser module B, and a deparser module C. Module A may be designed to use a first circuit to update header N1, a second circuit to update header N3, a third circuit to remove header N4, and an insertion circuit to insert header N8. Module B may be designed to remove header N2, remove header N4, remove header N6, and insert header N9. Module C may be designed to update header N1, insert header N7, and insert header N9.

The system 1000 also includes an identifier circuit 1025. The identifier circuit 1025 receives the copied headers and enable a corresponding deparser module that is suitable to perform the editing. For example, header N1, N7, and N9 are copied. The identifier circuit may identify header N1 needs to be updated, header N7 needs to be inserted, and header N9 need to be inserted and may enable the deparser module C to perform the editing.

Although various embodiments have been described with reference to the figures, other embodiments are possible. For example, this architecture may also be extended to have any number of the constituent blocks (e.g., multiple parsers, match-action pipelines, and/or editors) to implement an extended model (e.g., multiple parsers, match-action pipelines, and/or deparsers). In some embodiments, the match-action pipeline may be replaced by one or more other types of intermediate packet processing circuits. In some embodiments, the editor circuit may be implemented in other ways, for example, using a single complex operation, or using smaller simpler operations, or implementing modify, insert, or remove, using a replace operation.

To carry out the mapping of the language model into the implementation architecture, additional information describing which headers are used (e.g., read, written, or both) may be needed. In some embodiments, this information may be supplied by a programmer using some language annotations to mark such headers, or by explicitly describing the necessary editing process. In some embodiments, an algorithm may be used by a HLL compiler to automate the process, both to identify packet headers and header fields used, and to optimize the editing process with respect to the editor implementation. An example of the algorithm may include analysis of a parsing tree by following each branch of the parsing tree as it is described in the high-level language, discovering the possible sequences of packet headers that are supported, and determining the possible position and size of each header that is supported. The algorithm may also include analysis of header updates that occur in the match-action pipeline by following each branch of conditions within the match-action pipeline and determining what header updates are described and under what compile-time known conditions these occur (e.g., conditions may depend on another header being present in the packet). The algorithm may also include analysis of the order in which headers are emitted in the deparser by determining how the order of the emitted headers in the deparser is different from the order in which the headers were extracted in the parser, checking for duplicate headers (e.g., headers emitted multiple times) or headers emitted in a different order than they were encountered in the parser, and checking for compile-time known conditions within the deparser.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An integrated circuit, comprising:
a pipelined operation circuit coupled to receive at least a portion of an incoming data packet that comprises a stack of headers and a data payload, wherein the operation circuit is further configured to receive, from an intermediate packet processing circuit, header update information to modify the stack of headers, the operation circuit comprising:
a first editing circuit and a second editing circuit arranged in a sequential pipeline to perform, respectively, a first editing operation on the incoming data packet in a first number of clock cycles, and a second editing operation on the output of the first editing circuit in a second number of clock cycles subsequent to the first number of clock cycles; and,
a state machine circuit coupled to the first editing circuit to control a first operation of the first editing circuit, and coupled to the second editing circuit to control a second operation of the second editing circuit,
wherein the first editing operation and the second editing operation edit the stack of headers while the data payload is configured to stream through the operation circuit along with the stack of headers, and
wherein N editing operations are performed on a set of M bits in parallel, and the set of M bits pass through the N sequential editing circuits within 2N+1 clock cycles, wherein N is an integer number of the editing circuits arranged in the sequential pipeline.

2. The integrated circuit of claim 1, wherein the intermediate processing circuit comprises a match-action pipeline circuit configured with a header processing circuit to receive information copied from the data packet by a parser and to generate the updated header information to provide to the operation circuit.

3. The integrated circuit of claim 1, wherein at least one of the first and second editing circuits further comprises an updating circuit configured to update a portion of the information in the header stack.

4. The integrated circuit of claim 1, wherein at least one of the first and second editing circuits further comprises an updating circuit configured to update a portion of the information in the header stack and a removal circuit configured to remove existing information from the header stack by shifting a portion of the data packet that follows the removed information.

5. The integrated circuit of claim 1, wherein at least one of the first and second editing circuits comprises an insertion circuit configured to insert new information into the header stack by shifting a portion of the data packet that follows the inserted information.

6. The integrated circuit of claim 1, wherein at least one of the first and second editing circuits comprises a removal circuit configured to remove existing information from the header stack by shifting a portion of the data packet that follows the removed information.

7. The integrated circuit of claim 1, further comprising an identifier circuit configured to determine the editing operations to be performed on the incoming data packet.

8. The integrated circuit of claim 7, further comprising a second operation circuit configured to perform at least a third editing operation, wherein the identifier circuit is further configured to selectively enable one of the first and second operation circuits based upon the determination.

9. The integrated circuit of claim 8, further comprising a third operation circuit configured to perform at least a fourth editing operation, wherein the identifier circuit is further configured to selectively enable one of the first, second, and third operation circuits based upon the determination.

10. The integrated circuit of claim 1, wherein the sequential pipeline arrangement further comprises N−2 additional editing circuits arranged consecutively in a sequential pipeline with the first and second editing circuits to perform, respectively, N−2 editing operations on the output of the immediately preceding editing circuit, wherein the state machine circuit is further coupled to each of the N−2 additional editing circuits to control operation of that editing circuit.

11. The integrated circuit of claim 1, wherein the operation circuit and the state machine circuit are implemented in an ASIC.

12. The integrated circuit of claim 1, wherein the operation circuit and the state machine circuit are implemented in programmable logic of a field programmable gate array (FPGA).

13. A method to perform data packet deparsing performed in an integrated circuit, the method comprising:
receiving, with a pipelined operation circuit, at least a portion of an incoming data packet that comprises a stack of headers and a data payload;
receiving, with the operation circuit and from an intermediate packet processing circuit, header update information to modify the stack of headers, the operation circuit comprising:
a first editing circuit and a second editing circuit arranged in a sequential pipeline to perform, respectively, a first editing operation on the incoming data packet in a first number of clock cycles, and a second editing operation on the output of the first editing circuit 450a in a second number of clock cycles subsequent to the first number of clock cycles; and,
controlling, with a state machine circuit coupled to the first editing circuit, a first operation of the first editing circuit;
controlling, with state machine circuit coupled to the second editing circuit, a second operation of the second editing circuit;
editing, by the first editing operation and the second editing operation, the stack of headers while the data payload is configured to stream through the operation circuit along with the stack of headers; and,
performing N editing operations on a set of M bits in parallel, wherein the set of M bits pass through the N sequential editing circuits within 2N+1 clock cycles, wherein N is an integer number of the editing circuits arranged in the sequential pipeline.

14. The method of claim 13, further comprising updating, with at least one of the first and second editing circuits comprising an updating circuit, a portion of the information in the header stack.

15. The method of claim 13, further comprising inserting, with at least one of the first and second editing circuits comprising an insertion circuit, new information into the header stack by shifting a portion of the data packet that follows the inserted information.

16. The method of claim 13, further comprising removing, with at least one of the first and second editing circuits comprising a removal circuit, existing information from the header stack by shifting a portion of the data packet that follows the removed information.

17. The method of claim 13, further comprising performing, with the sequential pipeline arrangement further comprising N−2 additional editing circuits arranged consecutively in a sequential pipeline with the first and second editing circuits, respectively, N−2 editing operations on the output of the immediately preceding editing circuit; and, controlling, with the state machine circuit further coupled to each of the N−2 additional editing circuits, operation of each of the N−2 additional editing circuits.

18. The method of claim 13, wherein the first and second editing operations are generated in response to user-input description in a high-level language.

* * * * *